US 6,463,142 B1

(12) United States Patent
Kilp

(10) Patent No.: US 6,463,142 B1
(45) Date of Patent: Oct. 8, 2002

(54) MESSAGING SYSTEM WITH AUTOMATIC PROXY SERVICE

(75) Inventor: David Patrick Kilp, Colleyville, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/604,172

(22) Filed: Jun. 27, 2000

(51) Int. Cl.[7] .............................. H04M 1/64; H04M 3/42
(52) U.S. Cl. ................ 379/201.06; 379/88.11; 379/88.12; 379/201.07; 379/201.1; 379/207.12; 379/209.01
(58) Field of Search ........................ 379/38, 45, 67.1, 379/69, 70, 78, 88.11, 88.12, 88.17, 88.15, 93.09, 93.23, 93.35, 93.37, 201.06, 201.07, 201.08, 201.01, 207.12, 209.01; 455/445, 461, 412, 413

(56) References Cited

U.S. PATENT DOCUMENTS

| | | | | |
|---|---|---|---|---|
| 5,363,425 A | * | 11/1994 | Mufti et al. .................. 379/38 |
| 5,515,426 A | * | 5/1996 | Yacenda et al. ............. 379/201 |
| 5,742,905 A | * | 4/1998 | Pepe et al. ................... 455/461 |
| 5,752,191 A | * | 5/1998 | Fuller et al. ................. 455/445 |
| 5,822,418 A | * | 10/1998 | Yacenda et al. ............. 379/201 |
| 5,862,475 A | * | 1/1999 | Zicker et al. ............... 455/419 |
| 6,002,750 A | * | 12/1999 | Ertz ......................... 379/88.12 |
| 6,101,176 A | * | 8/2000 | Honkasato et al. ......... 370/335 |

* cited by examiner

Primary Examiner—Allan Hoosain
(74) Attorney, Agent, or Firm—Charles W. Bethards; Hisashi D. Watanabe

(57) ABSTRACT

A communications system includes a stationary unit, a mobile unit, and a proxy server. The stationary unit is adapted to send and receive messages. The mobile unit is adapted to establish a communication link with the stationary unit, and the mobile unit is also adapted to send and receive messages. The proxy server is adapted to route messages to one of the stationary unit and the mobile unit based on a status of the communication link between the stationary unit and the mobile unit. A method for routing messages includes monitoring the status of a communication link between a mobile unit and a stationary unit. A message is received and routed to one of the stationary unit and the mobile unit based on the status of the communication link.

20 Claims, 3 Drawing Sheets

MESSAGING SYSTEM WITH AUTOMATIC PROXY SERVICE

FIELD OF THE INVENTION

This invention relates generally to the field of personal communications and, more particularly, to a messaging system having an automatic proxy service for forwarding messages to a mobile unit when a user is out of range of a base unit.

BACKGROUND OF THE INVENTION

The proliferation of computer devices and the interconnectivity provided by global networks, such as the Internet, have provided many opportunities for changing the nature of business and personal communications. Electronic message systems, such as electronic mail (e-mail), voice mail, and instant messaging (IM) have provided convenient tools for contacting people or groups of people efficiently. Such electronic messaging systems provide a fast and inexpensive method to communicate and collaborate. Reliance on these messaging systems for communication has increased greatly in recent years, and the trend is likely to continue.

Due to the volume of electronic messages some individuals receive, they often feel "lost" without access to their messages. Mobile communication devices, such as personal data assistants (PDAs), notebook computers, pagers, cellular phones, etc. are commonly equipped with functionality for retrieving and responding to electronic messages. When away from the office, an individual may configure the mobile device to receive incoming messages in lieu of the normal message service installed in the user's office.

One particular messaging system that requires a physical point of presence is an IM system. An individual uses a computer to log into the message server of an IM provider, such as America On Line, Yahoo, or Microsoft Network. For example, the individual may log in at a desktop computer at the office. During the log in process, the message server notes the user name and IP address of the individual and registers that user name as being available to other users of the IM system. A different individual can access a list of "friends" to determine who is available on the IM system and send electronic messages to the friend's computer.

Various IM software applications allow the user to set a status flag regarding current availability. For example, typical status flags include available, busy, on the telephone, out to lunch, etc. Based on the availability flag, a different user can decide whether to send an electronic message or to wait until the individual is available.

One problem with the use of status flags is that individuals often forget to update their availability status. Typically, a user runs a plurality of computer applications simultaneously. The IM software may not always be visible, and the user may forget to change the status flag when the phone rings, the user gets called out of the office, the user leaves to get a cup of coffee, or the like. Hence, a user's status flag may indicate available, when in actuality, the user is not available. This situation may lead to frustration on the part of a sender trying to contact the user. Moreover, if the message is urgent, the errant availability flag may lead to an undesirable delay in securing a response.

To maintain availability when the user is away from the desktop, a mobile device may be configured to receive the user's messages. To set up the mobile device for IM service, the user would need to log out of the message server from the stationary location (e.g., the desktop), and log in to the service using the mobile device, thus registering the IP address of the mobile device. This change of service technique suffers the same disadvantage as the status flag technique, namely that the user must actively change the service. It would not be as cost-effective or as user-friendly to only log in using the mobile device, as mobile service rates are typically much higher than hardwired network connections, and the desktop computer generally has a better keyboard and display.

A similar problem exists with forwarding phone calls or voice mails to a mobile telephone. For example, if an individual leaves the office, calls to the office number or voice mails left at the office can be forwarded to the individual's mobile telephone. Again, the forwarding feature must be activated by the individual, and often this step is forgotten, especially for short trips away from the office area.

The present invention is directed to overcoming, or at least reducing the effects of, one or more of the problems set forth above.

BRIEF DESCRIPTION OF THE DRAWINGS

The invention may be understood by reference to the following description taken in conjunction with the accompanying drawings, in which like reference numerals identify like elements, and in which.

Figure 1:
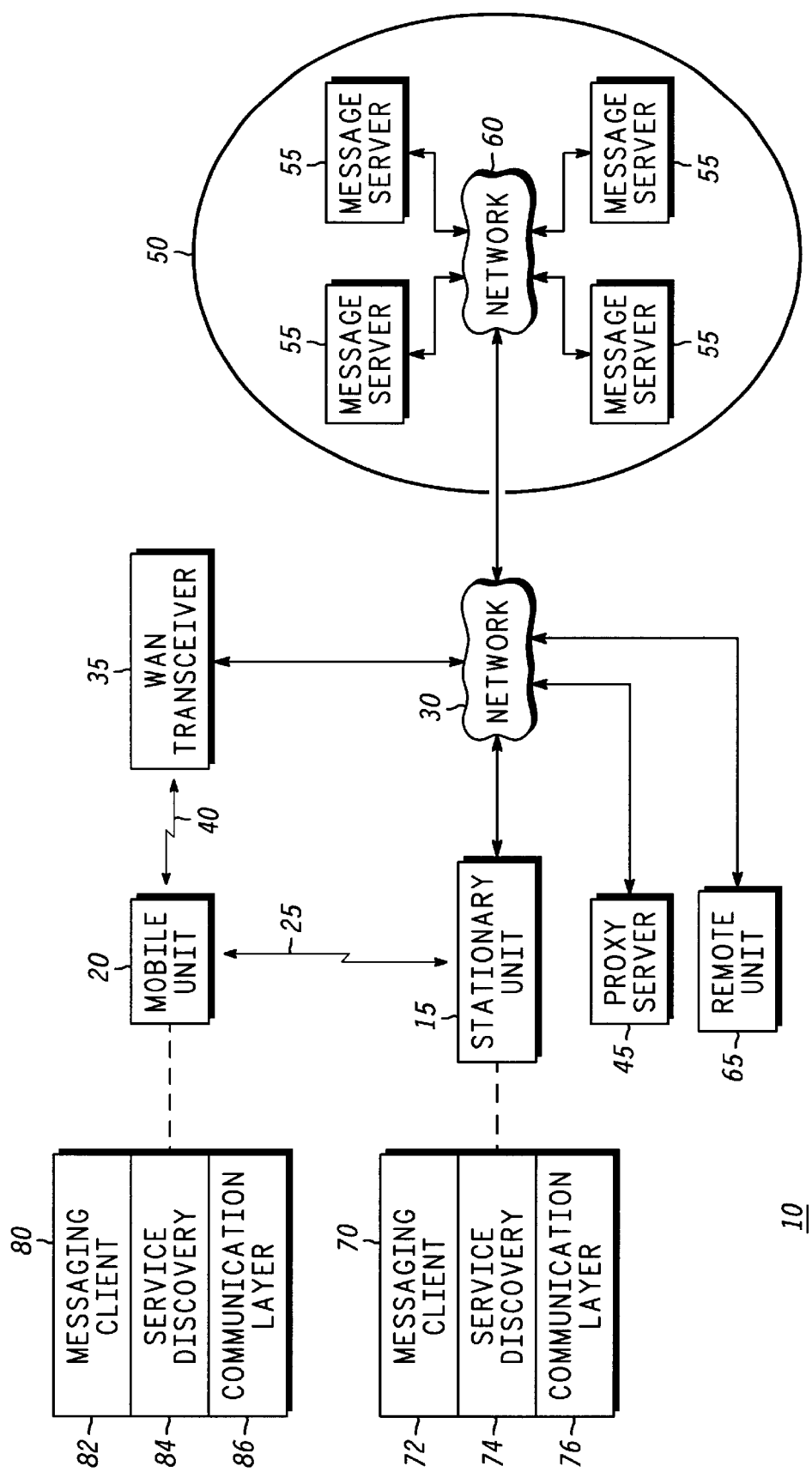
FIG. 1 is a simplified block diagram of a communications system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the figures, and in particular, to FIG. 1, a simplified block diagram of a communications system 10 in accordance with the present invention is shown. The communications system 10 includes a stationary unit 15 and a mobile unit 20 through which a user may send and receive messages. The communications system 10 may take on numerous forms, not all of which are described in complete detail herein. For example, the communications system 10 may be a computer network adapted to transfer electronic messages, such as e-mail or instant messages (IM). The communications system 10 may alternatively be a phone network adapted to handle phone calls. In the illustrated embodiment, the communications system 10 is described as it may be implemented for an IM application, however, the application of the present invention is not so limited and may be applied to numerous other communications applications.

The stationary unit 15 may take on a variety of forms, such as a desktop computer or an office telephone. Likewise, the mobile unit 20 may take on a variety of forms, such as a PDA, a notebook computer, a two-way pager, a radiotelephone in the form of a cordless, cellular, personal communication system (PCS) or other similar-type telephone, or the like. In general, the stationary unit 15 is a unit that is usually installed in one location. The stationary unit 15 may not necessarily be permanently installed. For example, the stationary unit 15 may be a notebook computer that is connected to an internal network at a docking station. The stationary unit 15 communicates with the mobile unit 20 over a communication link 25. It will be appreciated that the stationary and mobile units 15, 20 may be configured to communicate via numerous communication mediums such as a low power RF link, an infrared (IR) link, a hardwire serial connection (e.g., similar to those used for synchronizing PDAs), etc. For example, air interface standards, such as the Bluetooth standard, the home RF standard, IEEE 802.11, IrDA link, or some other standard may be used.

The stationary unit 15 is coupled to a communication network 30, such as the Internet, a local area network, a wide area network, or the public switched telephone network (PSTN), to permit voice and/or data communication between the stationary unit 15 and various other communication devices that are interconnected via the communication network 30. These other communication devices may include, but are not necessarily limited to, telephonic devices, computers, etc.

The mobile unit 20 is also adapted to communicate with a wide area network (WAN) transmitter 35 over a wide area link 40 using a wide area protocol, such as a cellular or pager protocol. The WAN transmitter 35 may also be connected to the communication network 30.

The communications system 10 further includes a proxy server 45 that intercedes in the message pathway and routes messages to either or both of the stationary and mobile units 15, 20, depending on their availability. The proxy server 45 may communicate with the stationary unit 15 through the communication network 30 and with the mobile unit 20 through the communication network 30 in conjunction with the WAN transmitter 35. The proxy server 45 may be resident on a distinct computer as illustrated, or alternatively, the proxy server 45 may be resident on the stationary unit 15.

Generally speaking, when a user is within the general vicinity of the stationary unit 15, messages are delivered by the proxy server 45 to the stationary unit 15. When the user moves out of the vicinity, messages are instead routed to the mobile unit 20. In operation, the proxy server 45 interfaces with an external messaging system 50, such as an IM system operated by a third party, through the communication network 30. The external messaging system 50 may include a plurality of message servers 55 interconnected through a network 60 operated by the messaging system service provider. To the external messaging system 50, the proxy server 45 appears to be a standard user (i.e., as if the user had logged into the external messaging system 50 directly from the stationary unit 15). The external messaging system 50 registers the IP address of the proxy server 45 as the destination of messages for the user. Emulation of a user connection may be accomplished by techniques well known to those of ordinary skill in the art, such as link simulation or direct manipulation of the client through an application program interface (API).

To send messages to the user logged in through the proxy server 45, a remote unit 65 logs in to the external messaging system 50 through the communication network 30. Messages sent through the remote unit 65 to the user are delivered by the external messaging system 50 to the proxy server 45. As described in greater detail below, the proxy server 45, based on availability knowledge, routes the message to either or both of the stationary and mobile units 15, 20, as appropriate. Replies or original messages are sent by the one of the stationary and mobile units 15, 20 that is available and routed to the proxy server 45, which, in turn, forwards the message or reply to the external messaging system 50.

In determining which one of the stationary and mobile units 15, 20 is available for receiving messages, the proxy server 45 maintains a status flag indicative of whether the mobile unit 20 is in the proximity of the stationary unit 15. The mobile unit 20 is considered to be in the vicinity of the stationary unit 15 when the communication link 25 (e.g., the low power radio frequency (RF) link or a hard-wired serial link) exists therebetween. Typically, when the communication link 25 is active, the user is in the office and available to respond to messages via the stationary unit 15. Alternatively, when the communication link 25 is lost, it may be assumed that the user has left the office, and is no longer available at the stationary unit 15. Communications are then routed to the mobile unit 20.

At some protocol layer, the stationary and mobile units 15, 20 are aware if there is a communication link 25 therebetween. In response to changes in the state of the communication link 25 (i.e., link established, link lost), either one or both of the stationary and mobile units 15, 20 sends a message to the proxy server 45 of the new state. The proxy server 45 then routes traffic through the communication network 30 to the stationary unit 15 or through the WAN transmitter 35 to the mobile unit 20, as appropriate. For messages sent to the stationary unit 15, the proxy server 45 may be configured to send copies of the messages to the mobile unit 25 (e.g., concurrently or in batches) or vice-a-versa to keep the stationary and mobile units 15, 20 synchronized.

In the illustrated embodiment, the stationary unit 15 executes a software application 70 including a messaging client 72, a service discovery layer 74, and a communication layer 76. Likewise, the mobile unit 20 executes a software application 80 including a messaging client 82, a service discovery layer 84, and a communication layer 86. The communication layers 76, 86 handle the basic level communication (i.e., modulation/demodulation of the baseband signal) between the stationary and mobile units 15, 20. The service discovery layers 74, 84 determine the respective capabilities of the stationary and mobile units 15, 20. The messaging clients 72, 82 provide the interface through which the user exchanges messages with the remote unit 65 through the external messaging system 50. The specific constructs of the messaging clients 72, 82, service discovery layers 74, 84, and communication layers 76, 86 depend on the specific external messaging system 50 being communicated with and the particular protocol used for establishing the communication link 25 between the stationary and mobile units 15, 20. Although the protocols layers 74, 76, 84, 86 and clients 72, 82 are illustrated as being single applications 70, 80, they may actually be one or more separate applications.

Figure 2:
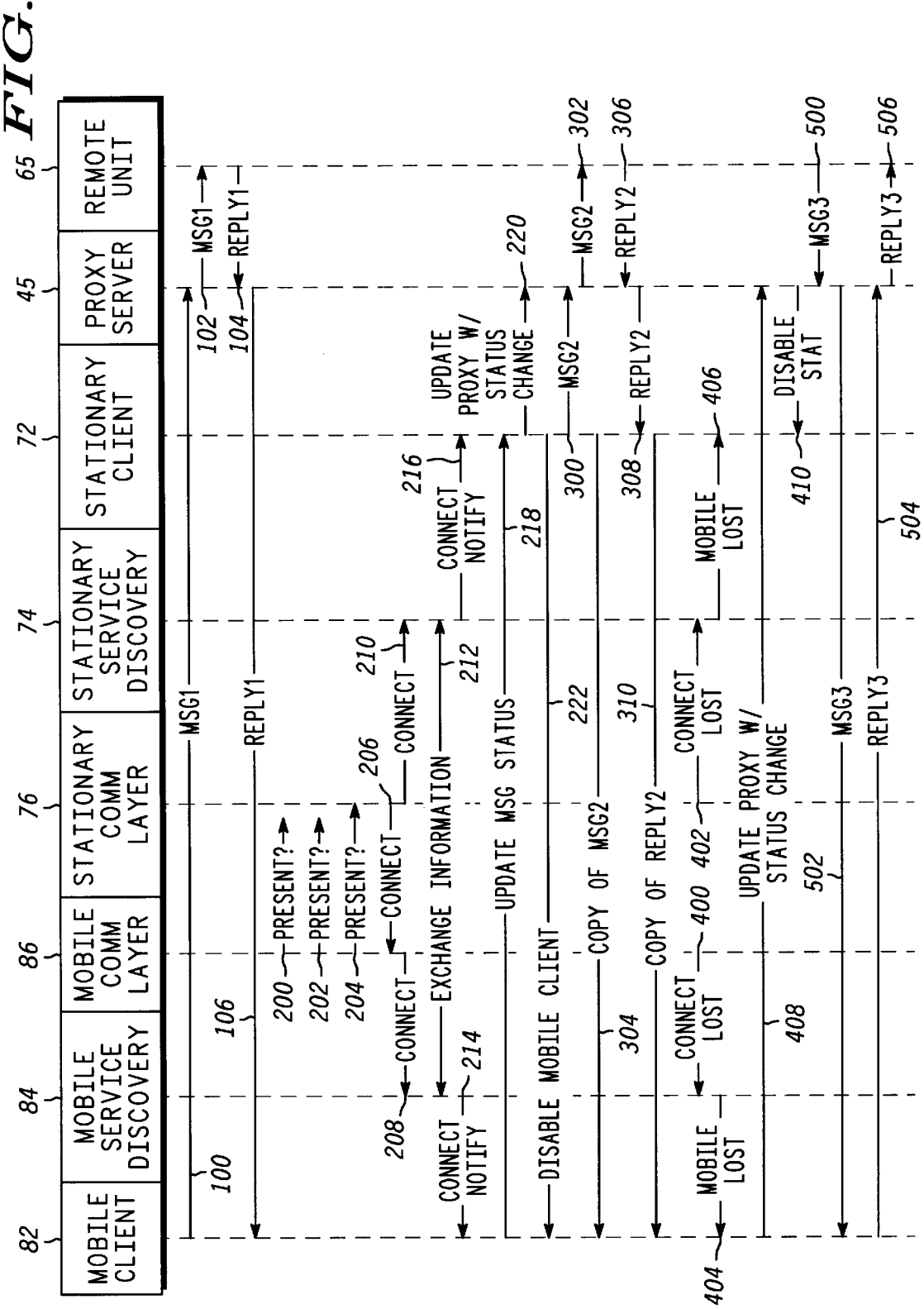
FIG. 2 is a communication flow diagram illustrating the operation of the communications system of FIG. 1.

The interaction between the applications 70, 80 and the proxy server 45 for routing messages from the remote unit 65 are described in greater detail in reference to FIG. 2, which is a communication flow diagram illustrating the operation of the communications system 10. FIG. 2. illustrates a variety of transactions issued by the various entities in the communications system 10.

In a first set of transactions (denoted by reference numerals in the 100s), the mobile unit 20 is not in the proximity of the stationary link 15 (i.e., no communication link 25). The user sends a message transaction (Msg1) 100 from the mobile unit 20 to the remote unit 65. The proxy server 45 receives the message transaction 100 from the WAN transmitter 35 and issues a corresponding message transaction 102 to the remote unit 65 through the communication network 30 to the external messaging system 50. The external messaging system 50, in turn, forwards the message transaction 102 to the remote unit 65. A reply message transaction (Reply1) 104 is sent back by the remote unit 65 through the same path to the proxy sever 45. The proxy server 45 sends a corresponding reply message transaction 106 via the WAN transmitter 30 to the mobile unit 20. Although not illustrated, the proxy server 45 may optionally send a copy of the reply message to the stationary unit 15 to maintain synchronization.

In a second set of transactions (denoted by reference numerals in the 200s), the mobile unit 20 establishes the communication link 25 with the stationary unit 15, and the proxy server 45 is reconfigured accordingly. The communication layer 86 of the mobile unit 20 periodically issues query transactions 200, 202, 204 to determine if the stationary unit 15 is near. The query transaction 204 is received by the communication layer 76 of the stationary unit 15 indicating proximity, and the communication layers 76, 86 issue connect transactions 208, 210 to their respective service discovery layers 74, 84. The service discovery layers 74, 84 share an information exchange transaction 212 to identify themselves and exchange operating parameters. After the information exchange, the service discovery layers 74, 84 issue connection notification transactions 214, 216 to their respective messaging clients 72, 82. The mobile client 82 sends a messaging status update transaction 218 to the stationary client 82, which sends a corresponding status update transaction 220 to the proxy server 45. It is conceivable that either or both of the mobile client 82 and the stationary client 72 may notify the proxy server 45. The clients 72, 82 then exchange a disable transaction 222 to deactivate the mobile client 82.

In a third set of transactions (denoted by reference numerals in the 300s), the user present at the stationary unit 15 issues a message transaction (Msg2) 300 addressed to the remote unit 65. The proxy server 45 intercepts the message transaction 300 and issues a corresponding transaction 302 through the communication network 30 to the external messaging system 50. The external messaging system 50, in turn, forwards the message transaction 302 to the remote unit 65. A copy of the message may be sent by the stationary client 15 via a copy transaction 304 to the mobile unit 20 for synchronization purposes. A reply message transaction (Reply2) 306 is sent back by the remote unit 65 through the same path to the proxy sever 45. The proxy server 45 sends a corresponding reply message transaction 308 via the communication network 30 to the stationary unit 15. Again, a copy transaction 310 may be issued by the stationary client 72 to the mobile client 82 to maintain synchronization.

In a fourth set of transactions (denoted by reference numerals in the 400s), the user moves out of the vicinity of the stationary unit 15, and the communication link 25 is lost. The stationary and mobile communication layers 76, 86 send connection lost transactions 400, 402 to their respective service discovery layers 74, 84, which forward mobile unit lost transactions 404, 406 to the stationary and mobile clients 72, 82. The mobile client 82 issues a status update transaction 408 through the WAN transmitter 35 to the proxy server 45 indicating the status change. Again, it is conceivable that either or both of the mobile client 82 and the stationary client 72 may notify the proxy server 45 of the status change. The proxy server 45 then issues a disable transaction 410 to deactivate the stationary client 72.

In a fifth set of transactions (denoted by reference numerals in the 500s), the remote unit sends a message transaction (Msg3) 500 to the proxy server 45. The proxy server 45 issues a corresponding transaction 502 to the mobile client 82 via the WAN transmitter 35, and a reply transaction (Reply3) 504 is received by the proxy server 45. The proxy server 45 issues a corresponding transaction 506 to the remote unit 65 via the routing path described above.

Figure 3:
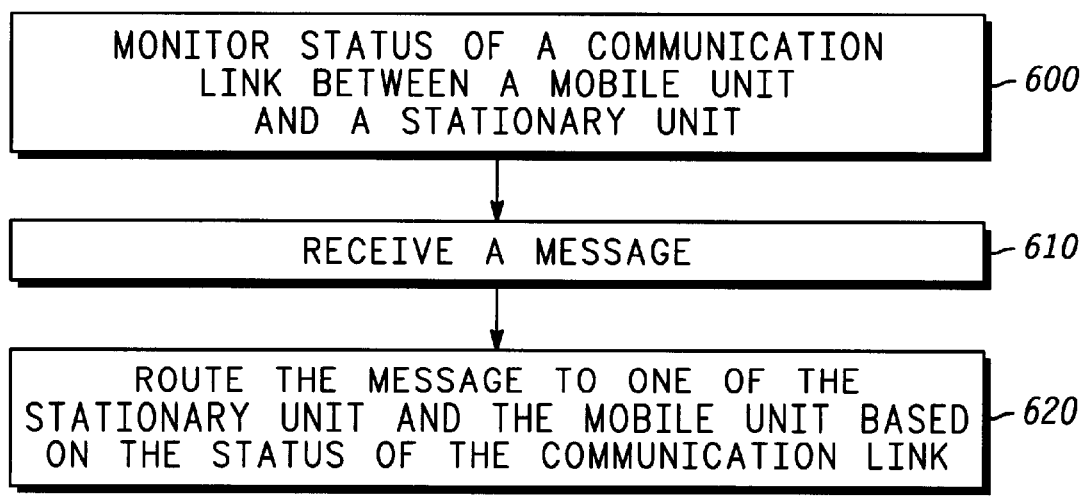
FIG. 3 is a flow diagram of a method for routing messages in accordance with another embodiment of the present invention.

Turning now to FIG. 3, a flow diagram of a method for routing messages in accordance with another embodiment of the present invention is provided. In block 600, the status of a communication link 25 between a mobile unit 20 and a stationary unit 15 is monitored. Monitoring the communication link 25 may include receiving a notification message from at least one of the stationary unit 15 and the mobile unit 20 in response to the communication link 25 being established or lost. A message is received in block 610, and the message is routed to one of the stationary unit 15 and the mobile unit 20 based on the status of the communication link 25 in block 620.

For example, the message is routed to the mobile unit 20 in response to the communication link 25 being inactive and to the stationary unit 15 in response to the communication link 25 being active. Messages may be routed to the stationary unit 15 via a communication network coupled to the stationary unit 15, and messages may be routed to the mobile unit 20 via a wide area network connection. Copies of the message may be sent to the other unit 15, 20.

Providing automatic proxy services for routing messages as described herein has numerous advantages. First, users of the messaging system need not worry about manually changing between stationary and mobile connections to the message service when leaving the office area. Also, individuals communicating with the user are more likely to have their messages received and responded to in a timely manner because of the automatic routing. Overall, the efficiency, convenience, and flexibility of the communications system 10 is enhanced, thus allowing a corresponding increase in the productivity of users of the system 10.

What is claimed is:

1. A communications system, comprising:
   a stationary unit adapted to send and receive messages;
   a mobile unit adapted to establish a communication link with the stationary unit, the mobile unit being adapted to send and receive messages; and
   a proxy server adapted to route messages to one of the stationary unit and the mobile unit based on a status of the communication link and transmit a copy of the messages to the other of the stationary unit and the mobile unit to keep the stationary and mobile units synchronized.

2. The communications system of claim 1, wherein the proxy server is adapted to route messages to the mobile unit in response to the communication link being inactive.

3. The communications system of claim 1, wherein the proxy server is adapted to route messages to the stationary unit in response to the communication link being active.

4. The communications system of claim 1, wherein at least one of the stationary unit and the mobile unit is adapted to notify the proxy server of a change in the status of the communication link.

5. The communications system of claim 1, further comprising:

a communication network coupling the proxy server to the stationary unit; and a wide area network transmitter adapted to allow communication between the proxy server and the mobile unit.

6. The communications system of claim 5, wherein the wide area transmitter is coupled to the communication network.

7. The communications system of claim 1, wherein the proxy server and the stationary unit are hosted by a single computer.

8. The communications system of claim 1, wherein the stationary unit comprises at least one of a desktop computer and a telephone.

9. The communications system of claim 1, wherein the mobile unit comprises at least one of a personal data assistant, a notebook computer, a two-way pager, and a radiotelephone.

10. The communications system of claim 1, wherein the communication link comprises at least one of a wireless link and a hard-wired connection.

11. A communications system, comprising:

a communication network;

a wide area network transmitter coupled to the communication network;

a stationary unit coupled to the communication network adapted to send and receive messages over the communication network;

a mobile unit adapted to establish a first communication link with the stationary unit and a second communication link with the wide area network transmitter, the mobile unit being further adapted to send and receive messages over the second communication link; and a proxy server coupled to the communication network and adapted to route messages to one of the stationary unit and the mobile unit based on a status of the first communication link and transmit a copy of the messages to the other of the stationary unit and the mobile unit to keep the stationary and mobile units synchronized.

12. The communications system of claim 11, wherein the proxy server is adapted to route messages to the mobile unit via the wide area network transmitter in response to the first communication link being inactive.

13. The communications system of claim 11, wherein the proxy server is adapted to route messages to the stationary unit via the communications network in response to the first communication link being active.

14. A method for routing messages, comprising:

monitoring the status of a communication link between a mobile unit and a stationary unit;

receiving a message; and routing the message to one of the stationary unit and the mobile unit based on the status of the communication link and transmitting a copy of the message to the other of the stationary unit and the mobile unit to keep the stationary and mobile units synchronized.

15. The method of claim 14, wherein routing the message comprises routing the message to the mobile unit in response to the communication link being inactive.

16. The method of claim 14 wherein routing the message comprises routing the message to the stationary unit in response to the communication link being active.

17. The method of claim 14, monitoring the status of the communication link comprises receiving a notification message from at least one of the stationary unit and the mobile unit in response to a change in the status of the communication link.

18. The method of claim 14, further comprising:

communicating with the stationary unit via a communication network coupled to the stationary unit; and communicating with the mobile unit via a wide area network connection.

19. A program storage device encoded with instructions, that, when executed by a computer, perform a method for routing messages, the method comprising:

monitoring the status of a communication link between a mobile unit and a stationary unit;

receiving a message; and routing the message to one of the stationary unit and the mobile unit based on the status of the communication link and transmitting a copy of the message to the other of the stationary unit and the mobile unit to keep the stationary and mobile units synchronized.

20. A communications system, comprising:

means for monitoring the status of a communication link between a mobile unit and a stationary unit;

means for receiving a message; and means for routing the message to one of the stationary unit and the mobile unit based on the status of the communication link and transmitting a copy of the message to the other of the stationary unit and the mobile unit to keep the stationary and mobile units synchronized.

* * * * *